US007449245B2

(12) United States Patent
Akarsu et al.

(10) Patent No.: US 7,449,245 B2
(45) Date of Patent: Nov. 11, 2008

(54) SUBSTRATES COMPRISING A PHOTOCATALYTIC TIO₂ LAYER

(75) Inventors: Murat Akarsu, Saarbruecken (DE); Ertugrul Arpac, Antalya (TR); Helmut Schmidt, Saarbruecken-Guedingen (DE)

(73) Assignee: Leibniz-Institut Fuer Neue Materialien Gemeinnuetzige GmbH, Saarbrueken (DE)

( * ) Notice: Subject to any disclaimer, the term of this patent is extended or adjusted under 35 U.S.C. 154(b) by 230 days.

(21) Appl. No.: 11/030,172

(22) Filed: Jan. 7, 2005

(65) Prior Publication Data

US 2005/0191505 A1    Sep. 1, 2005

Related U.S. Application Data

(63) Continuation of application No. PCT/EP03/07426, filed on Jul. 9, 2003.

(30) Foreign Application Priority Data

Jul. 9, 2002 (DE) .................. 102 30 928
Aug. 5, 2002 (DE) .................. 102 35 803

(51) Int. Cl.
*B32B 3/00* (2006.01)
*B32B 15/04* (2006.01)

(52) U.S. Cl. .................. 428/432; 428/312.2; 428/312.6; 428/312.8; 428/325; 428/701; 428/702

(58) Field of Classification Search .................. 428/428, 428/432, 446, 448, 697, 699, 701, 702
See application file for complete search history.

(56) References Cited

U.S. PATENT DOCUMENTS

| | | | |
|---|---|---|---|
| 6,037,289 A | 3/2000 | Chopin et al. | |
| 6,228,796 B1 | 5/2001 | Arakawa et al. | |
| 6,362,121 B1 | 3/2002 | Chopin et al. | |
| 6,420,437 B1 | 7/2002 | Mori et al. | |
| 6,632,771 B1 | 10/2003 | Maekawa et al. | |
| 6,737,145 B1 * | 5/2004 | Watanabe et al. | 428/64.4 |
| 6,794,065 B1 * | 9/2004 | Morikawa et al. | 428/699 |

FOREIGN PATENT DOCUMENTS

| | | |
|---|---|---|
| EP | 1016458 | 7/2000 |
| EP | 1052225 | 11/2000 |
| EP | 1136125 | 9/2001 |
| EP | 1162172 | 12/2001 |
| FR | 2738836 | 3/1997 |

OTHER PUBLICATIONS

C.J. Brinker, G.W. Scherer: "Sol-Gel Science—The Physics and Chemistry of Sol-Gel Processing", Academic Press, Boston, San Diego, New York, London, Sydney, Tokyo, Toronto (1990), pp. 108-115.

* cited by examiner

*Primary Examiner*—Timothy M Speer
(74) *Attorney, Agent, or Firm*—Greenblum & Bernstein, P.L.C.

(57) ABSTRACT

Substrates comprising a photocatalytic layer containing TiO₂ are produced using TiO₂ particles which may optionally be doped with metallic or non-metallic elements or compounds. The photocatalytic layer exhibits a concentration gradient of the TiO₂ particles. An organically modified inorganic hybrid layer may be provided between the substrate and the photocatalytic layer.

42 Claims, No Drawings

SUBSTRATES COMPRISING A PHOTOCATALYTIC TiO₂ LAYER

CROSS-REFERENCE TO RELATED APPLICATIONS

The present application is a continuation of International Application No. PCT/EP2003/007426, filed Jul. 9, 2003, the entire disclosure whereof is expressly incorporated by reference herein, which claims priority under 35 U.S.C. § 119 of German Patent Application 102 30 928.0, filed Jul. 9, 2002, and German Patent Application 102 35 803.6, filed Aug. 5, 2002.

BACKGROUND OF THE INVENTION

1. Field of the Invention

The present invention relates to substrates having a photocatalytic, $TiO_2$-containing layer, which have improved photocatalytic activity, and to processes for their production.

2. Discussion of Background Information

The photocatalytic properties of $TiO_2$ particles have long been known in the literature and have been intensively investigated. The photocatalytic effect is based on a semiconductor property of $TiO_2$, by which a photon forms a hole-electron pair which has a relatively long recombination time. Diffusion of holes and electrons to the surface sets in motion processes which develop strongly oxidative action directly or indirectly via water with subsequent hydrogen peroxide formation. The oxidation potential at over 3 eV is so high that virtually all organic substances which come into contact with such $TiO_2$ particles are oxidized. However, this process only proceeds when a notable UV light fraction is present in the incident light. Since the fraction of UV light in visible light is relatively small, the photocatalytic action as a result of the incident photons is limited. The recombination of the electrons with the holes further reduces the efficiency.

It has also been found that it is difficult, on substrates or surface layers which are themselves oxidizable, for example in the case of substrates or layers of organic polymers, to prevent oxidation by a photocatalytic layer applied thereto and thus damage to the substrate or to the layer. Even in the case of substrates or surface layers of glass, direct application of the photocatalytic layer has the disadvantage that sodium ions in the glass can diffuse into the photocatalytic layer, which damages the glass and/or disrupts the photocatalytic process.

It is therefore desirable to achieve an increased photocatalytic activity and/or to provide protection for substrates or surface layers which are sensitive toward the photocatalytic layer.

SUMMARY OF THE INVENTION

The present invention provides a substrate comprising a photocatalytic layer. The photocatalytic layer comprises photocatalytically active $TiO_2$ and a matrix material and the $TiO_2$ exhibits a concentration gradient in the matrix material such that the $TiO_2$ is enriched at the surface of the photocatalytic layer.

In one aspect of the substrate, a purely inorganic barrier layer may be disposed between the photocatalytically active $TiO_2$ and the substrate.

In another aspect of the substrate, the photocatalytic layer may comprise an inorganic matrix material and/or an organically modified inorganic matrix material.

In yet another aspect of the substrate, the $TiO_2$ may comprise doped $TiO_2$. For example, the doped $TiO_2$ may comprise a metal and/or a semimetal and/or a nonmetal and/or a compound of a metal, a semimetal and/or a nonmetal. Also, the doped $TiO_2$ may exhibit photocatalytic activity within a region of the visible light at wavelengths of >380 nm.

In yet another aspect, the substrate may comprise an electrically conductive sublayer which is disposed below the photocatalytic layer.

In a still further aspect, the substrate may comprise a hybrid layer of an organically modified inorganic material, said layer being disposed below the photocatalytic layer.

In another aspect, the substrate may exhibit a concentration gradient of $TiO_2$ and/or of organic groups.

In another aspect of the substrate of the present invention, the photocatalytic layer thereof may comprise a microstructured photocatalytic layer.

The present invention also provides a process for producing the above substrate. This process comprises:

a) mixing $TiO_2$ particles with a surface modifier to form surface-modified $TiO_2$ particles, b) adding an inorganic matrix-forming material and/or an organically modified inorganic matrix-forming material to the $TiO_2$ particles of a) to form a dispersion, c) applying the dispersion of b) to the substrate, d) hardening the applied dispersion to form a photocatalytic layer which has surface-modified $TiO_2$ particles enriched at the surface thereof, and e) photocatalytically decomposing the organic groups of at least those surface-modified $TiO_2$ particles which are enriched at the surface of the photocatalytic layer.

In one aspect of the process, the surface modifier may comprise at least one hydrophobic group. For example, the at least one hydrophobic group may comprise one or more fluorine atoms and/or a long-chain aliphatic hydrocarbon group and/or an aromatic group.

In another aspect of the process, the surface modifier may be selected from hydrolyzable silane compounds, carboxylic acids, carbonyl halides, carboxylic esters, carboxylic anhydrides, oximes, β-dicarbonyl compounds, alcohols, amines, alkyl halides and derivatives thereof.

In yet another aspect of the above process, the $TiO_2$ particles may comprise $TiO_2$ particles that have been prepared by i) preparing a mixture which comprises one or more hydrolyzable titanium compounds, water in a substoichiometric amount based on the hydrolyzable groups of the titanium compound(s), and an organic solvent, and ii) treating the mixture of i) at a temperature of at least 60° C. to form a dispersion or a precipitate of $TiO_2$ particles.

Optionally, the solvent may be removed to form a powder of $TiO_2$ particles. Further optionally, another solvent may be added to these $TiO_2$ particles.

In a still further aspect of the above process, the process may further comprise an activation of the photocatalytic layer of d) by irradiation.

In another aspect of the process, the $TiO_2$ particles may comprise nanoscale $TiO_2$ particles, for example, $TiO_2$ particles having an average particle size of $\leq 200$ nm, e.g., an average particle size of $\leq 50$ nm, or an average particle size of $\leq 10$ nm.

In another aspect, the process may comprise a heat treatment and/or an irradiation, and in the case of an irradiation the organically modified inorganic matrix-forming material may have functional groups through which crosslinking is possible.

The present invention also provides a substrate which comprises a photocatalytic $TiO_2$-containing layer, and a hybrid layer of an organically modified inorganic material disposed between the substrate and the photocatalytic layer. The organic constituents of the organically modified inorganic material have been decomposed photocatalytically at least at the interface to the photocatalytic $TiO_2$-containing layer to form a purely inorganic barrier layer.

In one aspect of this substrate, at least at the interface to the substrate the hybrid layer may consist of an organically modified inorganic material.

In another aspect of the substrate, the photocatalytic $TiO_2$-containing layer may comprise doped $TiO_2$. The doped $TiO_2$ may, for example, comprise a metal, a semimetal and/or a nonmetal and/or a compound of a metal, a semimetal and/or a nonmetal. Also, the doped $TiO_2$ may exhibit photocatalytic activity within a region of the visible light at wavelengths of >380 nm.

In yet another aspect, the substrate may comprise an electrically conductive sublayer which is disposed below the photocatalytic layer.

In a still further aspect, the photocatalytic layer may comprise a microstructured photocatalytic layer.

The present invention also provides a process for producing the above substrate. This process comprises:

a) applying an organically modified inorganic matrix-forming material to the substrate to form a hybrid layer, b) applying a composition comprising surface-modified $TiO_2$ particles having organic groups to the hybrid layer of a) to form the photocatalytic layer, the surface-modified $TiO_2$ particles having been prepared by mixing $TiO_2$ particles with a surface modifier, and c) photocatalytically decomposing the organic groups of the surface-modified $TiO_2$ and the organic constituents of the hybrid layer at least in the interface region to the photocatalytic layer to form a purely inorganic barrier layer.

In one aspect of the above process, the surface modifier may comprise at least one hydrophobic group. For example, the hydrophobic group may comprise one or more fluorine atoms and/or a long-chain aliphatic hydrocarbon group and/or an aromatic group. For example, the surface modifier may be selected from hydrolyzable silane compounds, carboxylic acids, carbonyl halides, carboxylic esters, carboxylic anhydrides, oximes, β-dicarbonyl compounds, alcohols, amines, alkyl halides and derivatives thereof.

In another aspect, the process may further comprise an activation of the photocatalytic layer by irradiation.

In yet another aspect of the process, the organically modified inorganic matrix-forming material may comprise a nanocomposite which comprises nanoscale inorganic particles. For example, the nanoscale particles may have a particle size of ≦200 nm. Also, the nanoscale particles may comprise $TiO_2$ particles, for example, $TiO_2$ particles having an average particle size of ≦200 nm, e.g., an average particle size of ≦50 nm, or an average particle size of ≦10 nm.

In a still further aspect of the process, the organically modified inorganic matrix-forming material may have been formed from an organically modified inorganic hydrolyzate and/or an organically modified inorganic polycondensate of at least one hydrolyzable compound which does not comprise a non-hydrolyzable organic group, and at least one hydrolyzable compound which comprises at least one non-hydrolyzable organic group, not more than 10 mol % of the at least one hydrolyzable compound containing a non-hydrolyzable organic group.

The present invention also provides a process for preparing a photocatalytically active $TiO_2$ powder. This process comprises:

a) preparing a mixture comprising at least one hydrolyzable titanium compound, water in a substoichiometric amount based on the hydrolyzable groups of the titanium compound, and an organic solvent, b) treating the mixture of a) at a temperature of at least 60° C. to form a dispersion or a precipitate of $TiO_2$ particles, and c) removing the solvent to form a powder of $TiO_2$ particles.

In one aspect of this process, b) may comprise a hydrothermal treatment and/or a heating under reflux.

In another aspect, not more than 0.7 mol of water based on 1 mol of the hydrolyzable groups of the at least one titanium compound may be used in a).

In yet another aspect, the mixture of a) may further comprise a dopant.

The present invention also provides an agglomerate-free, photocatalytically active $TiO_2$ which has an X-ray-determined volume average particle size of ≦10 nm, and is obtainable by the above process, including the various aspects thereof.

The present invention also provides a process for producing a substrate having a photocatalytic layer. This process comprises:

a) preparing a mixture which comprises at least one hydrolyzable titanium compound, water in a substoichiometric amount based on the hydrolyzable groups of the titanium compound, and an organic solvent, b) treating the mixture of a) at a temperature of at least 60° C. to form a dispersion or a precipitate of $TiO_2$ particles, c) optionally, removing the solvent to form a powder of $TiO_2$ particles and adding a different solvent to form a dispersion of $TiO_2$ particles, d) applying the dispersion of b) or c) to the substrate and e) heat-treating the applied dispersion to form a photocatalytic layer.

In one aspect of this process, b) may comprise a hydrothermal treatment and/or a heating under reflux.

In another aspect of the process, not more than 0.7 mol of water based on 1 mol of the hydrolyzable groups of the at least one titanium compound may be used in a).

In yet another aspect, the mixture of a) may further comprise a dopant.

The present invention also provides a substrate which comprises a photocatalytic layer and is obtainable by the above process, including the various aspects thereof.

The present invention also provides a substrate which is self-cleaning and/or capable of being cleaned with the aid of irradiation. This substrate comprises any of the substrates set forth above, including the various aspects thereof.

The present invention also provides an article for use in the medical or hygiene sector. This article comprises the above substrate which is self-cleaning and/or capable of being cleaned with the aid of irradiation.

As set forth above, the present invention provides a process for producing a substrate having a photocatalytic layer, which process comprises the following steps:

a) preparing a mixture comprising at least one hydrolyzable titanium compound, an organic solvent and water in a substoichiometric amount, based on the hydrolyzable groups of the titanium compound, b) treating the resulting mixture at a temperature of at least 60° C. to form a dispersion or a precipitate of $TiO_2$ particles, c) optionally exchanging the solvent by removing the solvent to form a powder of $TiO_2$ particles and adding another solvent to form a dispersion of $TiO_2$ particles, d) applying the dispersion to the substrate and
e) heat-treating the applied dispersion to form a photocatalytic layer.

In preferred embodiments, in the process for producing $TiO_2$ particles or for preparing the substrate having a photocatalytic layer, at least one dopant is additionally added in step a) and/or a hydrothermal treatment or heating under reflux is carried out in step b).

The substrate which is to be provided with the photocatalytic layer may be composed of any material suitable for this purpose. Examples of suitable materials are metals or metal alloys, glass, ceramic, including oxide ceramic, glass ceramic, or plastics. It is of course also possible to use substrates which have a surface layer composed of the aforementioned materials. The surface layer may, for example, be a metallization, an enameling, a glass or ceramic layer or a lacquer.

Examples of metals or metal alloys are steel, including stainless steel, chromium, copper, titanium, tin, zinc, brass and aluminum. Examples of glass are soda-lime glass, borosilicate glass, lead crystal and silica glass. The glass may be, for example, plate glass, hollow glass such as vessel glass, or laboratory glass. The ceramic may be, for example, ceramic based on the oxides $SiO_2$, $Al_2O_3$, $ZrO_2$ or MgO or the corresponding mixed oxides. Examples of the plastic which, like the metal too, may be present as a film are polyethylene, e.g. HDPE or LDPE, polypropylene, polyisobutylene, polystyrene, polyvinyl chloride, polyvinylidene chloride, polyvinyl butyral, polytetrafluoroethylene, polychlorotrifluoroethylene, polyacrylates, polymethacrylates, such as polymethyl methacrylate, polyamide, polyethylene terephthalate, polycarbonate, regenerated cellulose, cellulose nitrate, cellulose acetate, cellulose triacetate (TAC), cellulose acetate butyrate or rubber hydrochloride. A coated surface may be formed from customary primer paints or lacquers.

To produce a photocatalytic layer on the substrate, in a first aspect of the invention, a dispersion comprising $TiO_2$ particles may be prepared in accordance with the sol-gel process illustrated later. The $TiO_2$ particles may also precipitate to form a precipitate. Removal of the solvent affords a powder.

In the process of the first aspect of the invention, a mixture comprising at least one hydrolyzable titanium compound, an organic solvent and water in a substoichiometric amount based on the hydrolyzable groups of the titanium compound is initially prepared in step a), and the mixture may also optionally comprise at least one metal compound as a dopant.

The hydrolyzable titanium compound may in particular be a compound of the formula $TiX_4$ where the hydrolyzable X groups which may be different or preferably the same may, for example, be hydrogen, halogen (F, Cl, Br or I, in particular Cl and Br), alkoxy (preferably $C_{1-6}$-alkoxy, in particular $C_{1-4}$-alkoxy, e.g. methoxy, ethoxy, n-propoxy, isopropoxy, butoxy, isobutoxy, sec-butoxy and tert-butoxy), aryloxy (preferably $C_{6-10}$-aryloxy, e.g. phenoxy), acyloxy (preferably $C_{1-6}$-acyloxy, e.g. acetoxy or propionyloxy) or alkylcarbonyl (preferably $C_{2-7}$-alkylcarbonyl, e.g. acetyl). A specific example of a halide is $TiCl_4$. Preferred hydrolyzable X radicals are alkoxy groups, in particular $C_{1-4}$-alkoxy. Specific titanates used with preference are $Ti(OCH_3)_4$, $Ti(OC_2H_5)_4$ and Ti(n- or iso-$OC_3H_7)_4$.

The mixture also comprises water in a substoichiometric amount based on the hydrolyzable groups of the titanium compound, i.e. less than one mole of water is present based on 1 mol of hydrolyzable groups in the titanium compound. In other words, less than 4 mol of water are added based on 1 mol of a hydrolyzable titanium compound having 4 hydrolyzable groups. Preferably not more than 0.7 mol, more preferably not more than 0.6 mol and in particular not more than 0.5 mol or 0.4 mol, and not less than 0.35 mol, preferably not less than 0.30 mol of water, are used based on 1 mol of hydrolyzable groups in the titanium compound.

In a preferred aspect of the preparation of doped particles, the metal compound used for the doping may be any suitable metal compound, for example an oxide, a salt or a complex, for example, a halide, nitrates, sulfate, carboxylate (e.g. acetate) or acetylacetonate. The compound should suitably be soluble in the solvent used for the mixture. Suitable metals include all metals, especially metals selected from groups 5 to 14 of the Periodic Table of the Elements and the lanthanoids and actinoids. The groups are listed here in accordance with the new IUPAC system, as reproduced in Römpp Chemie Lexikon, 9th edition. The metal may be present in the compound in any suitable oxidation state.

According to the new IUPAC system, groups 1, 2 and 13 to 18 correspond to the 8 main groups (IA to VIIIA according to CAS), groups 3 to 7 correspond to subgroups 3 to 7 (IIIB to VIIB according CAS), groups 8 to 10 correspond to subgroup 8 (VIII according to CAS) and groups 11 to 12 correspond to subgroups 1 and 2 (Cu and Zn group, IB and IIB according to CAS).

Examples of suitable metals for the metal compound include W, Mo, Cr, Zn, Cu, Ag, Au, Sn, In, Fe, Co, Ni, Mn, Ru, V, Nb, Ir, Rh, Os, Pd and Pt. Preference is given to using metal compounds of W(VI), Mo(VI), Cr(III), Zn(II), Cu(II), Au(III), Sn(IV), In(III), Fe(III), Co(II), V(V) and Pt(IV). Very good results are obtained especially using W(VI), Mo(VI), Zn(II), Cu(II), Sn(IV), In(III) and Fe(III). Specific examples of preferred metal compounds include $WO_3$, $MoO_3$, $FeCl_3$, silver actate, zinc chloride, copper(II) chloride, indium(III) oxide and tin(IV) acetate.

The ratio between the metal compound and the titanium compound also depends upon the metal used and its oxidation state. In general the ratios used are, for example, such that a molar ratio of metal of the metal compound to titanium of the titanium compound (Me/Ti) of from 0.0005:1 to 0.2:1, preferably from 0.001:1 to 0.1:1 and more preferably to 0.005:1 to 0.1:1 results. Instead of metal doping, doping may also be carried out with semimetal or nonmetal elements, for example with carbon, nitrogen, phosphorus, sulfur, boron, arsenic, antimony, selenium, tellurium, chlorine, bromine and/or iodine. For this purpose, the dopants used are either the elements as such or suitable element compounds.

The doped $TiO_2$ particles have the particular feature that, with suitable selection of the doping element and the process, they may have photocatalytic activity even in the event of excitation with visible light of a wavelength of >380 nm (visible light or daylight photocatalysts).

The solvent used is an organic solvent in which the hydrolyzable titanium compound is preferably soluble. The solvent is also preferably miscible with water. Examples of suitable organic solvents include alcohols, ketones, ethers, amides and mixtures thereof. Preference is given to using alcohols, preferably lower aliphatic alcohols ($C_1$-$C_6$-alcohols), such as ethanol, 1-propanol, isopropanol, sec-butanol, tert-butanol, isobutyl alcohol, n-butanol and the pentanol isomers, especially 1-pentanol, of which particular preference is given to 1-propanol and 1-pentanol.

The mixture preferably comprises a catalyst for hydrolysis and condensation under sol-gel conditions, especially an acidic condensation catalyst, for example hydrochloric acid, phosphoric acid or formic acid.

The resulting mixture is then treated at a temperature of at least 60° C. to form a dispersion or a precipitate of doped or undoped $TiO_2$ particles. The heat treatment is preferably carried out hydrothermally or by heating under reflux. Appropriately, a relatively high dilution is employed in the heat treatment, especially when heating under reflux.

The heat treatment is carried out preferably over a period of from 0.5 to 30 h, preferably from 4 to 24 h, the duration depending on the temperature and any pressure applied. For example, anatase is obtained by hydrothermal treatment at 200° C. and autogenous pressure after a reaction time of 1 h in nanoparticulate form in a yield of approx. 35% of the theoretical yield.

The heating under reflux is typically carried out over a period of at least 3 h. The solvents used are preferably alcohols having at least 4, preferably at least 5 carbon atoms, for example n-pentanol, hexanol, heptanol or octanol. However, it is also possible to employ other polar solvents, for example thiols such as n-butyl, amyl, hexyl or heptyl mercaptan.

A hydrothermal treatment refers generally to a heat treatment of an aqueous solution or suspension under elevated pressure, for example at a temperature above the boiling point of the solvent and a pressure above 1 bar.

In the present invention, the term "hydrothermal treatment" includes also a heat treatment in a predominantly organic solvent which contains only little water, if any, under elevated pressure.

In the hydrothermal treatment, the mixture is heat-treated in a closed vessel or a closed autoclave. The treatment is carried out preferably at a temperature in the range of from 75° C. to 300° C., preferably above 200° C., more preferably from 225 to 275° C., for example at about 250° C. The heating, especially above the boiling point of the solvent, builds up a pressure in the closed vessel or autoclave (autogenous pressure). The resulting pressure may be, for example, above 1 bar, in particular from 50 to 500 bar or more, preferably from 100 to 300 bar, e.g. 200 bar. In general, the hydrothermal treatment is carried out for at least 0.5 h and preferably up to 7 or 8 h.

The heat treatment of step b) is carried out until the desired doped or undoped $TiO_2$ particles have been formed. The dispersion or precipitate may be used for the coating of the substrate directly or after solvent exchange. In order to obtain $TiO_2$ particles in powder form, the solvent is removed.

The resulting doped or undoped $TiO_2$ particles of the dispersion, of the precipitate or of the powder are predominantly crystalline and in the anatase form. The crystalline fraction of the resulting doped $TiO_2$ particles preferably amounts to more than 90%, preferably more than 95% and in particular more than 97%, i.e. the amorphous fraction is in particular below 3%, for example 2%. The average particle size (X-ray-determined volume average) is preferably not more than 20 nm, more preferably not more than 10 nm. In a particularly preferred aspect, particles having an average particle size of from about 2 to 10 nm are obtained. Compared to existing $TiO_2$ materials, the $TiO_2$ particles prepared in accordance with the invention exhibit agglomerate-free dispersibility. When the $TiO_2$ particles are doped, a particularly homogeneous distribution of the doping metals is obtained.

The resulting dispersion may be used as such to coat the substrate. Appropriately, there is a preceding solvent exchange. In this case, preference is given to removing the particles from the solvent in the dispersion obtained in step b). For this purpose, all processes known to those skilled in the art may be used. A centrifugation is particularly suitable. The removed $TiO_2$ particles are then dried (for example at 40° C. and 10 mbar). In this form, the particles may also be stored viably.

For the application to the substrate, the $TiO_2$ particles are dispersed again in a solvent. Suitable for this purpose are, for example, the above-listed solvents or water. The solvent used is preferably a water/alcohol mixture and more preferably water alone.

In a preferred aspect, an inorganic or organically modified inorganic matrix-forming material is added to the dispersion obtained after step b) or c). This may in particular be inorganic sols or organically modified inorganic hybrid materials or nanocomposites. Examples thereof are optionally organically modified oxides, hydrolyzates and (poly)condensates of at least one glass- or ceramic-forming element M, in particular an element M from groups 3 to 5 and/or 12 to 15 of the Periodic Table of the Elements, preferably of Si, Al, B, Ge, Pb, Sn, Ti, Zr, V and Zn, in particular those of Si and Al, most preferably Si, or mixtures thereof. Fractions of elements of groups 1 and 2 of the Periodic Table (e.g. Na, K, Ca and Mg) and of groups 5 to 10 of the Periodic Table (e.g. Mn, Cr, Fe and Ni) or lanthanoids may also be present in the oxide, hydrolyzate or (poly)condensate. Polyorganosiloxanes are preferred organically modified inorganic hybrid materials. Particular preference is given to using for this purpose hydrolyzates of glass- or ceramic-forming elements, in particular of silicon. The inorganic or organically modified inorganic matrix-forming material is preferably added in such an amount that the molar ratio of titanium of the titanium compound to glass- or ceramic-forming element M is from 100:0.01 to 0.01:100, preferably from 300:1 to 1:300. Very good results are obtained at a molar ratio Ti/M of from about 10:3 to 1:30. This addition achieves an improvement in the adhesion. When an organically modified inorganic matrix-forming material is used, all or only a portion of the glass- or ceramic-forming elements M present may have one or more organic groups which are non-hydrolyzable groups.

The inorganic or organically modified inorganic matrix-forming materials may be prepared by known processes, for example by flame pyrolysis, plasma processes, gas phase condensation processes, colloid techniques, precipitation processes, sol-gel processes, controlled nucleation and growth processes, MOCVD processes and (micro)emulsion processes. When solvent-free particles are obtained from the process, they are suitably dispersed in a solvent.

The inorganic sols and in particular the organically modified hybrid materials are preferably obtained by the sol-gel process. In the sol-gel process which can also be used for the separate preparation of the particles, hydrolyzable compounds are conventionally hydrolyzed with water, optionally under acidic or basic catalysis, and optionally at least partially condensed. The hydrolysis and/or condensation reactions lead to the formation of compounds or condensates having hydroxyl, oxo groups and/or oxo bridges which serve as precursors. It is possible to use stoichiometric amounts of water, but also smaller or larger amounts. The sol which forms can be adjusted to the viscosity desired for the coating composition by suitable parameters, for example degree of condensation, solvent or pH. Further details of the sol-gel process are described, for example, in C. J. Brinker, G. W. Scherer: "Sol-Gel Science—The Physics and Chemistry of Sol-Gel Processing", Academic Press, Boston, San Diego, New York, Sydney (1990).

In the preferred sol-gel process, the oxides, hydrolyzates or (poly)condensates are obtained by hydrolysis and/or condensation from hydrolyzable compounds of the above-mentioned glass- or ceramic-forming elements which optionally additionally carry non-hydrolyzable organic substituents to prepare the organically modified inorganic hybrid material.

Inorganic salts are formed in the sol-gel process in particular from hydrolyzable compounds of the general formula $MX_n$ where M is the above-defined glass- or ceramic-forming element, X is as defined in formula (I) below where two X groups may be replaced by one oxo group, and n corresponds to the valence of the element and is usually 3 or 4. They are preferably hydrolyzable Si compounds, especially of the formula (I) below.

Examples of usable hydrolyzable compounds of elements M which are different from Si are $Al(OCH_3)_3$, $Al(OC_2H_5)_3$, $Al(O-n-C_3H_7)_3$, $Al(O-i-C_3H_7)_3$, $Al(O-n-C_4H_9)_3$, $Al(O-sec-C_4H_9)_3$, $AlCl_3$, $AlCl(OH)_2$, $Al(OC_2H_4OC_4H_9)_3$, $TiCl_4$, $Ti(OC_2H_5)_4$, $Ti(O-n-C_3H_7)_4$, $Ti(O-i-C_3H_7)_4$, $Ti(OC_4H_9)_4$, $Ti(2\text{-ethylhexoxy})_4$, $ZrCl_4$, $Zr(OC_2H_5)_4$, $Zr(O-n-C_3H_7)_4$, $Zr(O-i-C_3H_7)_4$, $Zr(OC_4H_9)_4$, $ZrOCl_2$, $Zr(2\text{-ethylhexoxy})_4$, and Zr compounds which have complexing radicals, for example β-diketone and (meth)acryloyl radicals, sodium methoxide, potassium acetate, boric acid, $BCl_3$, $B(OCH_3)_3$, $B(OC_2H_5)_3$, $SnCl_4$, $Sn(OCH_3)_4$, $Sn(OC_2H_5)_4$, $VOCl_3$ and $VO(OCH_3)_3$.

The above remarks on the preferred silicon also apply mutatis mutandis to the other elements M. Particular preference is given to obtaining the sol or the organically modified inorganic hybrid material from one or more hydrolyzable and condensable silanes, and at least one silane optionally has a non-hydrolyzable organic radical. Particular preference is given to using one or more silanes having the following general formulae (I) and/or (II):

$$SiX_4 \qquad (I)$$

where the radicals X are the same or different and are hydrolyzable groups or hydroxyl groups,

$$R_a SiX_{(4-a)} \qquad (II)$$

where the radicals R may be the same or different and represent a non-hydrolyzable radical which optionally has a functional group, X is as defined above and a is 1, 2 or 3, preferably 1 or 2.

In the above formulae, the hydrolyzable groups X are, for example, hydrogen or halogen (F, Cl, Br or I), alkoxy (preferably $C_{1-6}$-alkoxy, for example methoxy, ethoxy, n-propoxy, isopropoxy and butoxy), aryloxy (preferably $C_{6-10}$-aryloxy, for example phenoxy), acyloxy (preferably $C_{1-6}$-acyloxy, for example acetoxy or propionyloxy), alkylcarbonyl (preferably $C_{2-7}$-alkylcarbonyl, for example acetyl), amino, monoalkylamino or dialkylamino having preferably from 1 to 12, in particular from 1 to 6, carbon atoms in the alkyl group(s).

The non-hydrolyzable radical(s) R is (are), for example, alkyl (preferably $C_{1-6}$-alkyl, for example methyl, ethyl, n-propyl, isopropyl, n-butyl, s-butyl and t-butyl, pentyl, hexyl or cyclohexyl), alkenyl (preferably $C_{2-6}$-alkenyl, for example vinyl, 1-propenyl, 2-propenyl and butenyl), alkynyl (preferably $C_{2-6}$-alkynyl, for example acetylenyl and propargyl) and aryl (preferably $C_{6-10}$-aryl, for example phenyl and naphthyl).

The mentioned radicals R and X may optionally have one or more customary substituents, for example halogen, ether, phosphoric acid, sulfonic acid, cyano, amide, mercapto, thio ether or alkoxy groups, as functional groups.

The radical R may contain a functional group through which crosslinking is possible. Specific examples of the functional groups of the radical R are epoxy, hydroxyl, amino, monoalkylamino, dialkylamino, carboxyl, allyl, vinyl, acryloyl, acryloyloxy, methacryloyl, methacryloyloxy, cyano, aldehyde and alkylcarbonyl groups. These groups are preferably bonded to the silicon atom via alkylene, alkenylene or arylene bridging groups which may be interrupted by oxygen or sulfur atoms or —NH groups. The bridging groups mentioned are derived, for example, from the abovementioned alkyl, alkenyl or aryl radicals. The bridging groups of the radicals R contain preferably from 1 to 18, in particular from 1 to 8 carbon atoms.

Particularly preferred hydrolyzable silanes of the general formula (I) are tetraalkoxysilanes such as tetramethoxysilane and in particular tetraethoxysilane (TEOS). Particular preference is given to inorganic sols obtained by acidic catalysis, for example TEOS hydrolyzates. Particularly preferred organosilanes of the general formula (II) are methyltriethoxysilane (MTEOS) and MTEOS hydrolyzates, epoxysilanes such as 3-glycidyloxypropyltrimethoxysilane (GPTS), methacryloyl-oxypropyltrimethoxysilane and acryloyloxy-propyltrimethoxysilane, of which GPTS hydrolyzates are used advantageously.

When an organically modified inorganic hybrid material is prepared, it is possible to use exclusively silanes of the formula (II) or a mixture of silanes of the formula (I) and (II). In the case of the inorganic silicon-based sols, exclusively silanes of the formula (I) are used, and fractions of hydrolyzable compounds of the above formula $MX_n$ are optionally added.

When the inorganic sol consists of discrete oxide particles dispersed in the solvent, they may improve the hardness of the layer. These particles are in particular nanoscale inorganic particles. The particle size (X-ray-determined volume average) is, for example, in the region of $\leq 200$ nm, in particular $\leq 100$ nm, preferably $\leq 50$ nm, for example from 1 nm to 20 nm.

According to the invention, the nanoscale particles used may, for example, be inorganic sols of $SiO_2$, $ZrO_2$, $GeO_2$, $CeO_2$, $ZnO$, $Ta_2O_5$, $SnO_2$ and $Al_2O_3$ (in all modifications, especially as boehmite AlO(OH)), preferably sols of $SiO_2$, $Al_2O_3$, $ZrO_2$, $GeO_2$ and mixtures thereof. Some of these sols are also commercially available, for example silica sols such as the Levasils® from Bayer AG.

The inorganic or organically modified inorganic matrix-forming material used may also be a combination of such nanoscale particles with inorganic sols or organically modified hybrid materials present in the form of hydrolyzates or (poly)condensates, which are referred to here as nanocomposites.

Optionally, organic monomers, oligomers or polymers of any kind may also be present as organic matrix-forming materials which serve as flexibilizers, these being customary organic binders. They may be used to improve the coatability. In general, they are decomposed photocatalytically after completion of the layer. The oligomers and polymers may have functional groups through which crosslinking is possible. This crosslinking is also possible in some cases for the above-illustrated organically modified inorganic matrix-forming materials. Mixtures of inorganic, organically modified inorganic and/or organic matrix-forming materials are also possible.

Examples of usable organic matrix-forming materials are polymers and/or oligomers which have polar groups such as hydroxyl, primary, secondary or tertiary amino, carboxyl or carboxylate groups. Typical examples are polyvinyl alcohol, polyvinylpyrrolidone, polyacrylamide, polyvinylpyridine, polyallylamine, polyacrylic acid, polyvinyl acetate, polymethylmethacrylic acid, starch, gum arabic, other polymeric alcohols, for example polyethylene-polyvinyl alcohol copolymers, polyethylene glycol, polypropylene glycol and poly(4-vinylphenol) or monomers or oligomers derived therefrom. The polyvinyl alcohol used may be, for example, the commercially available Mowiol® 18-88 from Hoechst.

The degree of dilution of the dispersion applied in step d) depends on factors including the desired coating thickness. In general, the dispersion has a solids content of less than 50% by weight, in particular less than 20% by weight and preferably less than 10% by weight, for example 2.5% by weight.

For the application, the customary processes are used, for example dipping, rolling, knife coating, flow coating, drawing, spraying, spinning or spreading. The applied dispersion is optionally dried and heat-treated, for instance for hardening or compaction. The heat treatment used for this purpose depends of course upon the substrate. In the case of plastics substrates or plastics surfaces which generally have a barrier layer (see below), it is not possible by their nature to use very high temperatures. For instance, polycarbonate (PC) substrates are heat treated, for example, at about 130° C. for 1 h. Generally, the heat treatment is carried out, for example, at a temperature of from 100 to 200° C. and, as long as no plastic is present, up to 500° C. or more. The heat treatment is carried out, for example, for from 15 min to 2 h. In general, layer thicknesses of from 50 nm to 30 µm are obtained, preferably from 100 nm to 1 µm, for example from 50 to 700 nm.

The inorganic sol or the organically modified inorganic hybrid material serves not only as a matrix-forming material for the photocatalytic layer, but also for improved layer adhesion. $TiO_2$ may be present in the layer as a matrix-forming constituent and/or as particles.

The photocatalytic layer is optionally and preferably activated by irradiation with visible and/or UV light, for example with a high-pressure mercury lamp of 700 W for from 1 to 5 min or a xenon lamp of 750 W for from 1 to 10 min. High-pressure mercury lamps have a relatively high proportion of UV light; the spectrum of xenon lamps corresponds approximately to that of sunlight. Preference is given to irradiating with UV light or a high proportion of UV light. Exceptionally active photocatalytic layers are obtained, and the efficiency can be increased by up to 10 times compared to the prior art.

As already mentioned above, direct application in the case of substrates which consist of a sensitive material or have a surface layer (for example a lacquer or a enamel) of such a sensitive material is possible only with difficulty, if at all. A barrier layer may be disposed between the substrate (optionally with surface coating) and the photocatalytic layer. For this purpose, it is possible to use an inorganic layer of an inorganic matrix-forming material, for which the above-described inorganic sols may be used.

It has further been found in accordance with the invention that it is possible to obtain a photocatalytic layer with "incorporated" barrier layer by forming a concentration gradient of $TiO_2$ in the photocatalytic layer. This barrier layer may be used advantageously not only for the photocatalytic layers prepared in accordance with the invention, but also in the customary photocatalytic layers.

Accordingly, in a second aspect, the present invention provides a substrate having a photocatalytic layer which comprises photocatalytically active $TiO_2$ and a matrix material, the $TiO_2$ being present in a concentration gradient such that the $TiO_2$ is enriched at the surface of the photocatalytic layer, and a purely inorganic barrier layer exists between the photocatalytically active $TiO_2$ and the substrate.

These photocatalytic layers having a concentration gradient of $TiO_2$ such that the concentration of $TiO_2$ is greatest at the surface of the photocatalytic layer may be produced in particular by a process in which surface-modified $TiO_2$ particles form a concentration gradient in a matrix-forming material by themselves.

It is possible to use the customary prior art $TiO_2$ particles for surface modification, which are available, for example, commercially. $TiO_2$ particles are available, for example, as P25 ($d_{50}$=30-40 nm) from Degussa.

In the second aspect of the invention, doped or undoped $TiO_2$ particles may be used. The doping may be carried out by prior art processes, in which the prior art metallic or nonmetallic dopants may be used, for example, the metals and non-metals mentioned above for the first inventive embodiment. The doping surprisingly achieves an increase in activity and also often photocatalytic activity in the visible light region (visible light photocatalysts).

Preference is given to using $TiO_2$ particles obtained by the sol-gel process. For this purpose, it is possible to use the abovementioned hydrolyzable titanium compounds. In a preferred embodiment, particles are used which have been prepared in accordance with the first aspect of the invention in steps a) and b), and doped or undoped $TiO_2$ particles may be used.

A dispersion of the $TiO_2$ particles in a solvent is generally prepared. Suitable for this purpose is, for example, toluene. It is also possible to use a slurry of $TiO_2$ particles in a solvent or a powder of $TiO_2$ particles without solvent. For this purpose, a surface modifier is added which has at least one hydrophobic or hydrophilic group, of which hydrophobic groups are preferred.

Suitable surface modifiers are (preferably low molecular weight or oligomeric, in some cases also polymeric) compounds which have one or more groups which can react or at least interact with the reactive groups (for example OH groups) present on the surface of the $TiO_2$ particles, and additionally have at least one hydrophobic or hydrophilic group.

Surface modification of the $TiO_2$ particles may be carried out, for example, by mixing the particles with suitable compounds illustrated below, optionally in a solvent and in the presence of a catalyst. Frequently, it is adequate to stir surface modifiers with the particles at room temperature over a certain period, for example over 1 to 3 h. Treatment in an ultrasound bath often also has an advantageous effect.

The surface modifiers may, for example, form either covalent bonds (including coordinate bonds in the form of complexes) or ionic (salt-type) bonds with the surface of the $TiO_2$ particles, while dipole-dipole interactions, hydrogen bonds and van der Waals interactions are examples of mere interactions. Preference is given to the formation of covalent bonds.

It is also preferred in accordance with the invention that the surface modifier has a relatively low molecular weight. For example, the molecular weight may be less than 1500, in particular below 1000 and preferably below 700. This of course does not rule out a distinctly higher molecular weight of the compounds (for example up to 2000 and more).

Suitable surface modifiers having groups which can react or interact with the surface groups of the $TiO_2$ particles are, for example, hydrolyzable silanes, carboxylic acids, carbonyl halides, carboxylic esters, carboxylic anhydrides, oximes, β-dicarbonyl compounds such as β-diketones, alcohols, polyethers and functionalized polyethers (e.g. trioxadecanoic acid), amines, alkyl halides and derivatives thereof.

As a basic concept of chemistry, the concept of hydrophilicity/hydrophobicity is very well known to those of skill in the art. Hydrophobic substances or groups repel water, while hydrophilic substances or groups attract water. The hydrophilic character may be formed, for example, by hydroxyl, oxy, carboxylate, sulfate, sulfonate functional groups or polyether chains in the substance. Suitable hydrophobic groups are, for example, long-chain aliphatic hydrocarbon groups, for example having from 3 to 30 or more carbon atoms, in particular alkyl groups, aromatic groups, or groups which have at least one fluorine atom, these preferably being hydrocarbon groups, in particular alkyl radicals, having from 3 to 20 or more carbon atoms and from 1 to 30 fluorine atoms.

The surface modifiers are preferably hydrolyzable silanes having at least one nonhydrolyzable hydrophobic or hydrophilic group, of which preference is given to those having a hydrophobic group. They are more preferably hydrolyzable silanes which have at least one hydrolyzable group which contains at least one fluorine atom (fluorosilanes) or a long-chain aliphatic hydrocarbon group, for example having from 3 to 30 carbon atoms, preferably an alkyl group or an aromatic group.

The surface modifiers which have hydrophobic groups and can be used in addition to the hydrolyzable silanes may have, for example, the formula $R^{\circ}$—Y where Y is —COOH, —OH, —COZ, -Z (where Z =halides such as F, Cl, Br or I), —C(O)O(O)CB (where B is any radical of a carboxylic acid or is $R^{\circ}$ or is a functional group of the other above-described compounds (which optionally includes a further group such as B) and $R^{\circ}$ is a long-chain aliphatic hydrocarbon group, preferably an alkyl group, for example having from 3 to 30 carbon atoms, or an aromatic group such as optionally substituted phenyl or naphthyl, or a hydrocarbon group, preferably an alkyl group, having at least one fluorine atom. In a carboxylic ester, for example, the radical of the carboxylic acid and/or the radical of the alcohol may form the hydrophobic group.

The preferred hydrolyzable silanes having a long-chain aliphatic hydrocarbon group as the hydrophobic group have in particular the above-illustrated formula (II) ($R_aSiX_{(4-a)}$) where a and X are each as defined above, a is preferably 1 and R is a long-chain aliphatic hydrocarbon group, for example having from 3 to 30 carbon atoms. The long-chain aliphatic hydrocarbon group is preferably an alkyl group. Optionally, silanes of the formula (II) may also be used in which R is an optionally substituted aromatic group.

According to the invention, particular preference is given to using hydrolyzable silane compounds which have at least one non-hydrolyzable radical as a hydrophobic group and have the general formula $$Rf(R)_bSiX_{(3-b)} \quad (III)$$

where X and R are each as defined in formula (I) or (II), Rf is a nonhydrolyzable group which has from 1 to 30 fluorine atoms bonded to carbon atoms which are preferably separated from Si by at least two atoms, preferably an ethylene, propylene, ethyleneoxy or propyleneoxy group, and b is 0, 1 or 2, preferably 0 or 1. R is in particular a radical without functional group, preferably an alkyl group, in particular $C_{1-4}$-alkyl such as methyl or ethyl. The Rf groups preferably contain from 3 to 25 and in particular from 3 to 21 fluorine atoms which are bonded to aliphatic (including cycloaliphatic) carbon atoms. Rf is preferably a fluorinated alkyl group having from 3 to 20 carbon atoms which is optionally interrupted by one or more oxygen atoms.

Examples of Rf are $CF_3CH_2CH_2$, $C_2F_5CH_2CH_2$, n-$C_6F_{13}CH_2CH_2$, i-$C_3F_7OCH_2CH_2CH_2$, n-$C_8F_{17}CH_2CH_2$ and n-$C_{10}F_{21}$—$CH_2CH_2$.

Any fluorine atoms which are bonded to aromatic carbon atoms (for example $C_6F_4$) are disregarded. The fluorine-containing Rf group may also be a chelate ligand. It is also possible that one or more fluorine atoms are bonded to a carbon atom from which a double or triple bond originates. Examples of usable fluorosilanes include $CF_3CH_2CH_2SiCl_2$ ($CH_3$), $CF_3CH_2CH_2SiCl(CH_3)_2$, $CF_3CH_2CH_2Si(CH_3)(OCH_3)_2$, $C_2F_5$—$CH_2CH_2$—$SiZ_3$, n-$C_6F_{13}$—$CH_2CH_2SiZ_3$, n-$C_8F_{17}$—$CH_2CH_2SiZ_3$, n-$C_{10}F_{21}$—$CH_2CH_2SiZ_3$ (where Z=$OCH_3$, $OC_2H_5$ or Cl); i-$C_3F_7O$—$CH_2CH_2CH_2$—$SiCl_2$ ($CH_3$), n-$C_6F_{13}$—$CH_2CH_2$—$Si(OCH_2CH_3)_2$, n-$C_6F_{13}$—$CH_2CH_2$—$SiCl_2$ ($CH_3$) and n-$C_6F_{13}$—$CH_2CH_2$—$SiCl(CH_3)_2$. Preference is given to using (3,3,4,4,5,5,6,6,7,7,8,8,8-tridecafluorooctyl)triethoxy-silane (FTS).

Examples of hydrolyzable silanes having a long-chain aliphatic hydrocarbon group are hexadecyltrimethoxysilane (HDTMS), dodecyltriethoxysilane and propyltrimethoxysilane. Further examples of surface modifiers having hydrophobic groups are heptadecafluorononanoic acid, stearic acid, heptafluorobutyryl chloride, hexanoyl chloride, methyl hexanoate, methyl perfluoroheptanoate, perfluorooctanoic anhydride, hexanoic anhydride, 2-heptanone oxime, 1,1,1-trifluoro-5,5-dimethylhexane-2,4-dione 2-oxime, 1,1,1,2,2,3,3-heptafluoro-7,7-dimethyl-4,6-octanedione, 1H,1H-pentadecafluorooctanol, octanol, hexyl chloride and nonafluorobutyl chloride.

Suitable surface modifiers having hydrophilic groups, in addition to the above-mentioned compound classes, also include unsaturated carboxylic acids, β-carbonylcarboxylic acids, with polymerizable double bonds, ethylenically unsaturated alcohols and amines, amino acids, epoxides and diepoxides.

Specific examples of organic compounds for surface modification with hydrophilic groups are diepoxides such as 3,4-epoxycyclohexylmethyl 3,4-epoxycyclohexane-carboxylate, bis(3,4-epoxycyclohexyl) adipate, cyclo-hexanedimethanol diglycidyl ether, neopentyl glycol diglycidyl ether, 1,6-hexanediol diglycidyl ether, propylene glycol diglycidyl ether, bisphenol A diglycidyl ether, bisphenol F diglycidyl ether, unsaturated carboxylic acids such as acrylic acid and methacrylic acid, and β-diketones such as acetylacetonate.

Further particularly preferred compounds for surface modification with hydrophilic groups include hydrolyzable silanes having at least (and preferably) one nonhydrolyzable radical having a hydroxyl, carboxylate or epoxy or glycidyloxy group, these being in particular silanes of the formula (II). Examples are glycidyloxyalkyltrialkoxysilanes, for example 3-glycidyl-oxypropyltrimethoxysilane and 3-glycidyloxypropyl-triethoxysilane.

Further examples of surface modifiers include diphosphates, polyphosphates, polyvinyl alcohol, polyvinylpyrrolidone and methyl vinyl ether-maleic anhydride copolymers.

In the surface modification, for example, 10 ml of solvent may be used for 1 g of $TiO_2$ powder. The resulting dispersion with the surface modifier is simply stirred, for example for 2 h, which achieves the surface modification of the particles. The ratio of $TiO_2$ to surface modifier added is, on a molar basis, preferably from 1:0.005 to 1:0.1 and in particular from 1:0.01 to 1:0.02, this applying in particular to a surface modifier having at least one fluorine atom.

This is preferably followed by a solvent exchange to another organic solvent such as methyl ethyl ketone, acetone, chloroform or petroleum ether.

Subsequently, an inorganic or organically modified matrix-forming material is added. It is possible for this purpose, for example, to add an inorganic sol or an organically modified inorganic hybrid material, as illustrated above for the first aspect of the invention. The abovementioned nanoscale particles may also be present.

The surface modifier serves to generate the concentration gradient in the matrix of the matrix-forming material. In a hydrophilic matrix, surface modifiers having a hydrophobic group are used and, in the case of a hydrophobic matrix, surface modifiers having a hydrophilic group are used. This achieves a potential difference which leads to demixing, so that the surface-modified $TiO_2$ particles are enriched at the surface. Since the matrix-forming materials and the solvent which are used are generally hydrophilic, preference is given to surface modification with hydrophobic groups.

The application of the resulting dispersion to the substrate and the heat treatment are effected in the customary manner, for example as described above. The hydrophobic character of the hydrophobic groups on the surface of the $TiO_2$ particles results in demixing in the thus obtained dispersion, by which the surface-modified $TiO_2$ particles are enriched at the surface of the photocatalytic layer after application to the substrate. In the course of the hardening of the applied layer, a concentration gradient of the surface-modified $TiO_2$ particles in the other inorganic or organically modified matrix-forming material or in the matrix therefrom is thus formed. In the lower region of the layer is disposed predominantly the inorganic or organically modified inorganic matrix-forming material or the matrix formed therefrom.

In the course of irradiation, the photocatalytic activity of the layer destroys at least the hydrophobic organic groups, which manifests itself in a considerable reduction in the contact angle after irradiation. As a result of the concentration gradient, the matrix of the inorganic or organically modified matrix-forming materials is predominantly at the interface to the substrate and contains substantially no $TiO_2$ there. When organically modified inorganic matrix-forming material has been used, the photocatalytic oxidation, illustrated above for the "insulated" barrier layer, of the organic constituents takes place in the region of the photocatalytic layer in which $TiO_2$-enriched regions and substantially $TiO_2$-free regions adjoin, so that an inorganic barrier layer is also formed there. Thus formed in accordance with the invention is an "incorporated" barrier layer of inorganic material which can protect the substrate disposed thereunder.

Here too, it is possible in principle to use all above-mentioned substrates. Particularly advantageously, the photocatalytic layer with incorporated barrier layer is applied to a substrate made of glass or plastic or a surface layer of these materials on the substrate.

It has further been found that a specific hybrid layer of an organically modified inorganic material affords an outstanding barrier layer. This barrier layer may be used not only for the photocatalytic layers produced in accordance with the invention, but also in the customary photocatalytic layers.

In a third aspect, the present invention therefore provides a substrate having a photocatalytic, $TiO_2$-containing layer, which is characterized in that a hybrid layer of organically modified inorganic material is provided between the substrate and the photocatalytic layer. In this material, the first activation by irradiation forms a gradient in the carbon content at the surface of the barrier layer owing to the oxidation of the organic constituents. The thus obtained gradient material has a photocatalytically active, $TiO_2$-containing inorganic layer on the surface, followed by an inorganic barrier layer which merges into the inorganic-organic hybrid material with increasing layer depth. The diffusion of the $TiO_2$ particles into the surface of the barrier layer during the layer production likewise forms a gradient in the $TiO_2$ concentration.

This barrier layer offers firstly the advantage that reliable protection of sensitive materials from the photocatalytic layer is ensured, and secondly the barrier layer can be applied in a simple wet-chemical manner and be applied in the desired layer thickness directly and without fractures. The organic constituents give rise to a certain flexibility in the coating, and a reliable barrier action is surprisingly achieved despite the organic constituents used.

The substrate used may in principle be any of the above-mentioned substrates. Particularly advantageously, the barrier layer is applied to a substrate made of glass or plastic or to a surface layer of this material on the substrate.

The barrier layer is a hybrid layer made of organically modified inorganic material whose organic constituents have been photocatalytically decomposed at least at the interface to the photocatalytic $TiO_2$ layer to form a purely inorganic protective layer.

To produce this hybrid layer, the above-described organically modified inorganic hybrid material is used as the coating composition. All remarks made above for this material apply here as well, unless stated otherwise, although the hybrid material is not added to the $TiO_2$-containing dispersion, but rather is applied as such to the substrate.

Preference is given to using an organically modified inorganic hybrid material in which not more than 10 mol %, preferably not more than 5 mol % and in particular not more than 3 mol % and preferably at least 0.1 mol %, more preferably at least 0.5 mol % and in particular at least 1 mol %, for example from 0.1 to 10 mol %, preferably from 1 to 3 mol %, of the glass- or ceramic-forming elements M present have one or more organic groups. In other words, preferably not more than 10 mol % and in particular not more than 3 mol %, for example, for example from 0.1 to 10 mol %, preferably from 1 to 3 mol %, of the glass- or ceramic-forming elements M present carry one or more organic groups. At least a portion or all of the organic groups preferably have a functional group through which crosslinking is possible. The hybrid material is preferably prepared by the sol-gel process. Useful solvents are those mentioned above. It is more preferably a hydrolyzate or condensate of silanes of the formula (I) and of the formula (II). At least a portion of the silanes of the formula (I) may optionally be replaced by other hydrolyzable compounds of a glass- or ceramic-forming element M.

To prepare the hybrid material, preference is given to adding a stoichiometric amount of water to the hydrolyzable compounds. The resulting coating composition is used, for example, in the form of a 1 to 70% by weight sol/gel (based on the solids content) in an alcohol. A combination of hydrolyzable compounds which is used with particular preference is TEOS or MTEOS and GPTS.

The organically modified inorganic hybrid material may preferably comprise the above-mentioned nanoscale particles to form a nanocomposite. Preference is given to not adding any organic polymers to the organic-modified inorganic hybrid material, i.e., the coating composition is preferably free of organic polymers.

The hybrid material may be applied in a customary manner, for example by the above-described process. The applied layer is optionally dried and hardened, and the hardening may be carried out by heat or irradiation. Optionally, the heat treatment may be carried out together with the photocatalytic layer. With regard to the temperature and the duration, the conditions specified above for the photocatalytic layer apply. The resulting layer thickness is, for example, from 50 nm to 1 µm, preferably from 100 nm to 1 µm, for example from 100 to 700 nm.

A $TiO_2$-containing composition is applied to the hybrid layer and comprises surface-modified $TiO_2$ particles. Surface-modified $TiO_2$ particles are used as are illustrated above for the second aspect of the invention. It is possible to use surface modifiers having hydrophobic or hydrophilic groups.

In general, photocatalytically active $TiO_2$ particles are distributed in a matrix, and the $TiO_2$ may also be part of the matrix. The layer may even consist only of $TiO_2$. The matrix may generally be formed from inorganic or from organically modified inorganic matrix materials. Accordingly, the composition may also comprise inorganic or organically modified inorganic matrix-forming materials, as have been illustrated above. The abovementioned nanoscale particles may also be present. However, the composition may also comprise only $TiO_2$ particles, so that a photocatalytic layer composed of only $TiO_2$ is formed.

It has been found that the layer of the hybrid material, as a result of photocatalytic oxidation of the organic fraction, merges at least at the interface to the photocatalytic layer into a purely inorganic system. In this system, a photocatalytic oxidation of the organic constituents of the hybrid layer lying thereunder takes place through the overlapping photocatalytically active layer. This process is often restricted to a few nanometers of the uppermost level of this layer, since the diffusion of holes and electrons only has a very short range. The conversion of the uppermost level of the hybrid layer to an inorganic layer stops the decomposition process and affords an active barrier layer which prevents diffusion of sodium ions from glass substrates into the photocatalytic layer and protects sensitive plastics substrates from damage by the photocatalytic layer. In addition, the organic groups of the surface-modified $TiO_2$ are photocatalytically decomposed.

In all three aspects described, a further increase in the photocatalytic action can be achieved when an electrically conductive sublayer is used below the photocatalytic layer and/or specific electrically conductive particles are added to the photocatalytic layer.

The doped metal oxides used as electrically conductive particles may, for example, comprise doped tin oxide such as ITO (indium tin oxide), ATO (antimony-doped tin oxide) and FTO (fluorine-doped tin oxide) and/or aluminum-doped zinc oxide. It is also possible to use an electrically conductive polymer such as BAYTRON from Bayer AG. Useful semiconductors are, for example, optionally doped germanium or silicon. The electrically conductive particles may be added to the dispersion for the photocatalytic layer, for example, in the form of powder or of a dispersion in a solvent.

Preference is given to using highly transparent conductive particles. This prevents a high light absorption, as is caused, for example, by conductive metal particles, and still more effective photocatalytic layers are obtained.

Alternatively or simultaneously, an electrically conductive sublayer may be provided as a layer under the photocatalytically active layer. The electrically conductive sublayer may comprise a metal, a semiconductor, an electrically conductive polymer or a doped metal oxide. Examples of the doped metal oxide, the semiconductor or the electrically conductive polymer are the same as specified above as examples of the electrically conductive particles. Examples of the metal which may also be a metal alloy are steel, including stainless steel, chromium, copper, titanium, tin, zinc, brass and aluminum.

The sublayer may be present on the substrate as a layer or be the substrate itself. For the application of an electrically conductive layer as a sublayer to a substrate, the processes familiar to those of skill in the art may be used, for example wet-chemical processes, deposition processes (sputtering) or a metallization. In general, thin layers are sufficient.

In all embodiments illustrated, the substrates may be fired with the photocatalytic layers in order to obtain purely inorganic layers. Moreover, particles having a larger diameter, for example in the μm range, may also be incorporated into all layers.

The inventive substrates having the photocatalytic layers may be used, for example, as self-cleaning surfaces (optionally supported by irradiation with light) or for air cleaning. The substrates having a photocatalytic layer prepared in accordance with the invention are suitable for a wide range of applications for antimicrobial purposes and/or for self-cleaning, for example for machines, paints, lacquers, furniture, facades, roofs, textiles, vehicles, signaling systems, films, protective and partition walls, traffic technology, automobiles, air and rail vehicles, windows, doors, greenhouses, walls, tiles, floors, tents, tarpaulins, outdoor constructions, fences, natural stone, concrete, renders, plaster, baseplates, monuments, wood, slabs, claddings, window frames, textiles, coverings, concrete, plastics surfaces of all types, plastics glazings, helmets, visors, casings, outdoor constructions, appliances of all types, for example medicinal instruments, household appliances, traffic signs, steel constructions and steel facades. The layers are also suitable as antifogging layers, for example on glass, mirrors, claddings or partitions. In addition, it is also possible to use magnetic, for example superparamagnetic, particles.

A particular field of application is the sterilization or the protection of instruments of all types, and especially of medicinal, including veterinary and dental, instruments, and instruments in the sanitary sector, against soiling, for example by infectious substances such as prions (for example for BSE control). Further important fields of application are in food technology and the dairy industry.

DETAILED DESCRIPTION OF THE INVENTION

The following abbreviations are used:
TEOS: tetraethoxysilane
FTS: (3,3,4,4,5,5,6,6,7,7,8,8,8-tridecafluorooctyl)-triethoxysilane
GPTS: (3-glycidyloxypropyl)trimethoxysilane
HDTMS: hexadecyltrimethoxysilane

EXAMPLE 1

Hydrothermal Preparation of $TiO_2$ (Anatase)

9.6 g (0.034 mol) of titanium isopropoxide ($Ti(O^iPr)_4$) is added to 14.5 g of n-propanol and, after stirring at room temperature for 5 min, admixed with 0.67 g (0.0068 mol) of 37% HCl. After 20 min, 0.712 g (0.063 mol) of water is added with intensive stirring.

The mixture is subsequently diluted with 41.9 g of n-propanol, then treated at 250° C. and 200 bar of pressure for 7 h. The resulting anatase is centrifuged off and dried at 50° C. and 10 mbar.

EXAMPLE 2

Hydrothermal preparation of doped $TiO_2$ (Anatase, Sn ($CH_3CO_2)_4$ Dopant)

9.6 g (0.034 mol) of titanium isopropoxide ($Ti(O^iPr)_4$) is added to 14.5 g of n-propanol and, after stirring at room temperature for 5 min, admixed with 0.67 g (0.0068 mol) of 37% HCl. After 20 min, 0.712 g (0.063 mol) of water is added with intensive stirring.

The mixture is subsequently diluted with 41.9 g of n-propanol, then the mixture is admixed with 0.635 g (0.0018 mol) of $Sn(CH_3CO_2)_4$ and treated at 250° C. and 200 bar for 7 h. The resulting anatase is centrifuged off and dried at 50° C. and 10 mbar.

EXAMPLE 3

Hydrothermal Preparation of Doped $TiO_2$ (Anatase, $WO_3$ Dopant)

9.6 g (0.034 mol) of titanium isopropoxide (Ti(O$^i$Pr)$_4$) is added to 14.5 g of n-propanol and, after stirring at room temperature for 5 min, admixed with 0.67 g (0.0068 mol) of 37% HCl. After 20 min, 0.712 g (0.063 mol) of water is added with intensive stirring.

The mixture is subsequently diluted with 41.9 g of n-propanol, then the mixture is admixed with 0.039 g (0.00017 mol) of WO$_3$ and treated at 250° C. and 200 bar for 7 h. The resulting anatase is centrifuged off and dried at 50° C. and 10 mbar.

EXAMPLE 4

Surface Modification of TiO$_2$ (Anatase) Powder With FTS

Of the TiO$_2$ powders prepared by Examples 1 to 3, in each case 1.0 g thereof is stirred with 8.67 g of toluene and then admixed with 0.077 g of FTS. After stirring for 2 hours, the toluene is removed in a rotary evaporator.

EXAMPLE 5

Surface Modification of TiO$_2$ (Anatase) Powder With HDTMS

Of the TiO$_2$ powders prepared by Examples 1 to 3, in each case 1.0 g thereof is stirred with 8.67 g of toluene and then admixed with 0.312 g of HDTMS. After stirring for 2 hours, the toluene is removed in a rotary evaporator.

EXAMPLE 6

Production of a Photocatalytic Layer With Undoped TiO$_2$

To prepare a GPTS hydrolyzate, 23.6 g (0.1 mol) of GPTS is admixed with 5.4 g (0.3 mol) of water. The mixture is subsequently stirred at room temperature overnight.

0.05 g of the FTS-modified, undoped TiO$_2$ powder prepared by Example 4 is dispersed in 1.56 g of MEK (methyl ethyl ketone) and then admixed with 0.44 g of formamide. The resulting dispersion is mixed with stirring with 4.14 g of the GPTS hydrolyzate prepared.

The resulting coating composition is applied to polycarbonate plaques (PC plaques) of 10 cm×10 cm by means of a spin coating apparatus (spincoater) at 1000 rpm. Subsequently, the plaques are hardened at 128° C. for 1 h. The coating thicknesses are from 2 to 3 μm. The contact angle of the resulting layers with respect to water is 101°.

The coated PC plaques are irradiated with a xenon lamp (750 W) for 4 min. After the coating, the contact angle of the PC plaques toward water is only 10°.

To determine the photocatalytic activity of the resulting PC plates, the change in the light absorption with time at 553 nm of a Rhodamine B solution is determined. For this purpose, 20 ml of an aqueous Rhodamine B solution (concentration 6 ppm) is contacted with the PC plaque which is irradiated with a xenon lamp (750 W). The absorption of the Rhodamine B solution at 553 nm is measured at intervals in order to monitor the degradation of Rhodamine B. After approx. one hour, all of the Rhodamine B has decomposed.

EXAMPLE 7

Production of a Photocatalytic Layer With Sn-Doped TiO$_2$ 0.05 g of the HDTMS-modified, Sn-doped TiO$_2$ powder prepared in Example 5 is dispersed in 1.56 g of petroleum ether and then admixed with 0.44 g of formamide. The resulting dispersion is mixed with stirring with 4.14 g of the GPTS hydrolyzate prepared as in Example 6.

The resulting coating composition is applied to polycarbonate plaques (PC plaques) of 10 cm×10 cm by means of a spin coating apparatus (spincoater) at 1000 rpm. Subsequently, the plaques are hardened at 128° C. for 1 h. The layer thicknesses are from 2 to 3 μm. The contact angle of the resulting layers with respect to water is 92°.

The coated PC plaques are irradiated with a xenon lamp (750 W) for 4 min. After the irradiation, the contact angle of the PC plaques toward water was less than 10°.

The photocatalytic activity of the resulting PC plaques is determined in the same experimental setup as in Example 6 by determining the light absorption at 553 nm of a Rhodamine B solution. All of the Rhodamine B has decomposed after about 35 min.

EXAMPLE 8

Preparation of Photocatalytic Layers With TEOS Hydrolyzate

To prepare a TEOS hydrolyzate, 12.36 g (0.0594 mol) of TEOS in 15.96 g of ethanol is admixed with 9.06 g of water. To this is added with stirring 0.2 g of concentrated (37%) HCl. After stirring for 1 h, 0.28 g of GPTS is added and the mixture is stirred at room temperature overnight. A TEOS hydrolyzate with 2 mol % of GPTS is obtained.

Of the FTS-modified TiO$_2$ powders prepared in Example 4 (undoped, Sn-doped and W-doped), in each case a 2.5 percent by weight solution thereof in methyl ethyl ketone is prepared and mixed with 0.2 g of the TEOS hydrolyzate prepared which contains 2 mol % of GPTS (molar Ti:Si ratio=10:5).

The resulting coating composition is applied to polycarbonate plaques (PC plaques) of 10 cm×10 cm by means of a spin coating apparatus. Subsequently, the plaques are hardened at 128° C. for 1 h.

EXAMPLE 9

Determination of the Photocatalytic Activity of Layers With Doped TiO$_2$

To determine the photocatalytic activity, layers with doped TiO$_2$ are investigated. For this purpose, Sn-doped TiO$_2$ powder (Sn(IV)), W-doped TiO$_2$ powder (W(VI)), Fe-doped TiO$_2$ powder (Fe(III)) and In-doped TiO$_2$ powder (In(III)) are used in different ratios of Ti to doping metal.

The Sn- and W-doped TiO$_2$ powders are prepared with Sn(CH$_3$CO$_2$)$_4$ and WO$_3$ in accordance with Examples 2 and 3, and the used amounts are varied in accordance with the desired ratio of Ti to dopant (from 0.5 to 10 mol % of dopant). In an analogous manner, doped TiO$_2$ powders are prepared with FeCl$_3$ and In$_2$O$_3$. For comparison, unmodified anatase is also prepared in each case under the same conditions.

Of the doped TiO$_2$ powders prepared, in each case a 2.5 percent by weight solution in methyl ethyl ketone is prepared and mixed with 0.2 g of TEOS hydrolyzate prepared as in Example 8 which contains 2 mol % of GPTS.

The resulting coating composition is applied to polycarbonate plaques (PC plaques) by means of a spin coating apparatus. The plaques are hardened at 128° C. for 1 h.

The photocatalytic activity is again determined with a Rhodamine B solution (6 ppm in H$_2$O). The coated plaques are each contacted with 20 ml of the Rhodamine B solution and then irradiated with UV light for 10 min. Thereafter, the absorption of the Rhodamine B solution is measured at 553 nm. For comparison, measurements on Rhodamine B are also carried out in the same manner without contact with photocatalytic layers and in contact with undoped anatase. The results are listed in the table which follows. It is evident therefrom that doping can in some cases achieve distinctly more rapid degradation rates.

TABLE

| Amount | Dopant | | | |
|---|---|---|---|---|
| (mol %) | Fe(III) | W(VI) | Sn(IV) | In(III) |
| —* | 1.46 | 1.42 | 1.08 | 1.07 |
| 0** | 0.24 | 0.31 | 0.125 | 0.12 |
| 0.5 | 0.31 | 0.04 | 0.065 | 0.009 |
| 1.0 | 0.46 | 0.03 | 0.103 | −0.043 |
| 5 | 0.27 | 0.284 | −0.06 | 0.023 |
| 10 | 0.084 | 0.20 | −0.08 | 0.084 |

Absorption at 553 nm at 10 min of UV irradiation

*measurement without photocatalytic layer
**undoped anatase

EXAMPLE 10

$TiO_2$ (Anatase) Preparation Under Reflux 19.2 g (0.068 mol) of titanium isopropoxide ($Ti(O^iPr)_4$) is added to 29.02 g of 1-pentanol and, after stirring at room temperature for 5 min, admixed with 1.33 g (0.0136 mol) of 37% HCl. After 20 min, 1.42 g (0.079 mol) of water is added rapidly with intensive stirring and stirred further at room temperature for 20 min. The mixture is subsequently boiled under reflux at 132° C. for 16 h. The resulting anatase is centrifuged off and dried at 50° C. and 10 mbar.

Surface Modification of Refluxed $TiO_2$ (Anatase) Powder With TODA

Of the $TiO_2$ powder obtained above, in each case 1 g thereof is stirred with 4 g of water and then admixed with 0.2 g of TODA (trioxadecanoic acid). After ultrasound treatment for 10 min, a transparent solution is obtained.

Dispersion of Refluxed $TiO_2$ (Anatase) Powder With Toluene

Of the $TiO_2$ powder obtained above, in each case 1 g thereof is stirred with 1.5 g of toluene. After ultrasonic treatment for 1 min, a transparent solution is obtained.

What is claimed is:

1. A substrate having a photocatalytic layer thereon, wherein the photocatalytic layer comprises photocatalytically active $TiO_2$ particles having an average particle size of $\leq 200$ nm and a matrix material and wherein the $TiO_2$ particles exhibit a concentration gradient in the matrix material such that the $TiO_2$ particles are enriched at a surface of the photocatalytic layer.

2. The substrate of claim 1, wherein a purely inorganic barrier layer is disposed between the photocatalytic layer and the substrate.

3. The substrate of claim 1, wherein the photocatalytic layer comprises at least one of an inorganic matrix material and an organically modified inorganic matrix material.

4. The substrate of claim 1, wherein the $TiO_2$ particles comprise doped $TiO_2$ particles.

5. The substrate of claim 4, wherein the doped $TiO_2$ particles comprise at least one of a metal, a semimetal, a nonmetal and compounds thereof.

6. The substrate of claim 5, wherein the doped $TiO_2$ particles exhibit photocatalytic activity within a region of visible light at wavelengths of >380 nm.

7. The substrate of claim 1, wherein the substrate has thereon an electrically conductive sublayer which is disposed below the photocatalytic layer.

8. The substrate of claim 1, wherein the substrate has thereon a hybrid layer of an organically modified inorganic material, which layer is disposed below the photocatalytic layer.

9. The substrate of claim 8, wherein the substrate exhibits a concentration gradient of at least one of $TiO_2$ and organic groups.

10. The substrate of claim 1, wherein the photocatalytic layer comprises a microstructured photocatalytic layer.

11. The substrate of claim 1, wherein the substrate is obtainable by a process which comprises:
    a) mixing $TiO_2$ particles with a surface modifier to form surface modified $TiO_2$ particles which comprise organic groups,
    b) adding at least one of an inorganic matrix-forming material and an organically modified inorganic matrix-forming material to the $TiO_2$ particles of a) to form a dispersion,
    c) applying the dispersion of b) to the substrate,
    d) hardening the applied dispersion to form a photocatalytic layer which has surface-modified $TiO_2$ particles enriched at a surface thereof, and
    e) photocatalytically decomposing the organic groups of at least those surface-modified $TiO_2$ particles which are enriched at the surface of the photocatalytic layer.

12. The substrate of claim 11, wherein the surface modifier comprises at least one hydrophobic group.

13. The substrate of claim 12, wherein the at least one hydrophobic group comprises at least one of a fluorine atom, a long-chain aliphatic hydrocarbon group and an aromatic group.

14. The substrate of claim 11, wherein the surface modifier is selected from hydrolyzable silane compounds, carboxylic acids, carbonyl halides, carboxylic esters, carboxylic anhydrides, oximes, β-dicarbonyl compounds, alcohols, amines, alkyl halides and derivatives thereof.

15. The substrate of claim 11, wherein the $TiO_2$ particles comprise $TiO_2$ particles that have been prepared by
    i) preparing a mixture which comprises at least one hydrolyzable titanium compound having hydrolysable groups, water in a substoichiometric amount based on the hydrolyzable groups of the titanium compound, and an organic solvent,
    ii) treating the mixture of i) at a temperature of at least 60° C. to form a dispersion or a precipitate of $TiO_2$ particles, and
    iii) optionally, removing solvent to form a powder of $TiO_2$ particles and, optionally, adding another solvent.

16. The substrate of claim 11, wherein the process further comprises activating the photocatalytic layer of d) by irradiation.

17. The substrate of claim 11, wherein d) comprises at least one of a heat treatment and an irradiation, and in the case of an irradiation the organically modified inorganic matrix-forming material has functional groups through which crosslinking is possible.

18. The substrate of claim 1, wherein the photocatalytically active $TiO_2$ particles have an average particle size of $\leq 50$ nm.

19. The substrate of claim 1, wherein the photocatalytically active $TiO_2$ particles have an average particle size of $\leq 10$ nm.

20. The substrate of claim 1, wherein a hybrid layer comprising an organically modified inorganic material comprising organic constituents is disposed between the substrate and the photocatalytic layer and wherein the organic constituents have been decomposed photocatalytically at an interface to the photocatalytic $TiO_2$-containing layer to form a purely inorganic barrier layer so that the inorganic barrier layer merges into an inorganic-organic hybrid material with increasing layer depth.

21. The substrate of claim 20, wherein at least at the interface to the substrate the hybrid layer consists of an organically modified inorganic material.

22. The substrate of claim 20, wherein the photocatalytic layer comprises doped $TiO_2$ particles.

23. The substrate of claim 22, wherein the doped $TiO_2$ particles comprise at least one of a metal, a semimetal, a nonmetal and compounds thereof.

24. The substrate of claim 23, wherein the doped $TiO_2$ particles exhibit photocatalytic activity within a region of visible light at wavelengths of >380 nm.

25. The substrate of claim 20, wherein the substrate has thereon an electrically conductive sublayer which is disposed below the photocatalytic layer.

26. The substrate of claim 20, wherein the photocatalytic layer comprises a microstructured photocatalytic layer.

27. The substrate of claim 20, wherein the substrate is obtainable by a process comprising:
   a) applying an organically modified inorganic matrix-forming material to the substrate to form a hybrid layer comprising organic constituents,
   b) applying a composition comprising surface-modified $TiO_2$ particles having organic groups to the hybrid layer of a) to form the photocatalytic layer, the surface-modified $TiO_2$ particles having been prepared by mixing $TiO_2$ particles with a surface modifier, and
   c) photocatalytically decomposing the organic groups of the surface-modified $TiO_2$ particles and the organic constituents of the hybrid layer in an interface region to the photocatalytic layer to form a purely inorganic barrier layer in the interface region.

28. The substrate of claim 27, wherein the surface modifier comprises at least one hydrophobic group.

29. The substrate of claim 28, wherein the at least one hydrophobic group comprises at least one of a fluorine atom, a long-chain aliphatic hydrocarbon group and an aromatic group.

30. The substrate of claim 27, wherein the surface modifier is selected from hydrolyzable silane compounds, carboxylic acids, carbonyl halides, carboxylic esters, carboxylic anhydrides, oximes, β-dicarbonyl compounds, alcohols, amines, alkyl halides and derivatives thereof.

31. The substrate of claim 27, wherein the process further comprises activating the photocatalytic layer by irradiation.

32. The substrate of claim 27, wherein the organically modified inorganic matrix-forming material comprises a nanocomposite which comprises nanoscale inorganic particles.

33. The substrate of claim 32, wherein the nanoscale particles have a particle size of $\leq 200$ nm.

34. The substrate of claim 32, wherein the nano scale particles comprise $TiO_2$ particles.

35. The substrate of claim 34, wherein the $TiO_2$ particles have an average particle size of $\leq 200$ nm.

36. The substrate of claim 34, wherein the $TiO_2$ particles have an average particle size of $\leq 50$ nm.

37. The substrate of claim 34, wherein the $TiO_2$ particles have an average particle size of $\leq 10$ nm.

38. The substrate of claim 27, wherein the organically modified inorganic matrix-forming material has been formed from at least one of an organically modified inorganic hydrolyzate and an organically modified inorganic polycondensate of at least one hydrolyzable compound which does not comprise a non-hydrolyzable organic group, and at least one hydrolyzable compound which comprises at least one non-hydrolyzable organic group, not more than 10 mol % of the at least one hydrolyzable compound containing a non-hydrolyzable organic group.

39. A substrate which is one of self-cleaning or capable of being cleaned with the aid of irradiation, wherein the substrate comprises the substrate of claim 1.

40. A medical or hygiene article, wherein the article comprises the substrate of claim 39.

41. A substrate which is one of self-cleaning or capable of being cleaned with the aid of irradiation, wherein the substrate comprises the substrate of claim 20.

42. A medical or hygiene article, wherein the article comprises the substrate of claim 41.

* * * * *